United States Patent
Doda et al.

(10) Patent No.: US 10,787,578 B2
(45) Date of Patent: Sep. 29, 2020

(54) NON-PHOSPHORUS CHEMICAL CONVERSION TREATMENT AGENT AND TREATMENT LIQUID FOR PLASTIC WORKING, CHEMICAL CONVERSION FILM, AND METAL MATERIAL WITH CHEMICAL CONVERSION FILM

(71) Applicant: Henkel AG & Co. KGaA, Duesseldorf (DE)

(72) Inventors: Tatsunori Doda, Tokyo (JP); Hiroyuki Matsuo, Tokyo (JP)

(73) Assignee: Henkel AG & Co. KGaA, Duesseldorf (DE)

(*) Notice: Subject to any disclaimer, the term of this patent is extended or adjusted under 35 U.S.C. 154(b) by 394 days.

(21) Appl. No.: 15/135,025

(22) Filed: Apr. 21, 2016

(65) Prior Publication Data

US 2016/0237285 A1    Aug. 18, 2016

Related U.S. Application Data

(63) Continuation of application No. PCT/JP2014/076783, filed on Oct. 7, 2014.

(30) Foreign Application Priority Data

Oct. 22, 2013  (JP) ................. 2013-218865

(51) Int. Cl.
   *C09D 5/08*        (2006.01)
   *C23C 22/40*       (2006.01)

(52) U.S. Cl.
   CPC .............. *C09D 5/086* (2013.01); *C23C 22/40* (2013.01)

(58) Field of Classification Search
   CPC ........................... C09D 5/086; C23C 22/40
   See application file for complete search history.

(56) References Cited

U.S. PATENT DOCUMENTS

| | | | |
|---|---|---|---|
| 7,294,362 B2 | 11/2007 | Tanaka et al. | |
| 2004/0249036 A1* | 12/2004 | Higai | C09D 5/08 524/394 |
| 2005/0103229 A1* | 5/2005 | Tanaka | C09D 5/12 106/162.2 |
| 2011/0045309 A1* | 2/2011 | Reusmann | C09D 5/10 428/457 |
| 2012/0018053 A1 | 1/2012 | Nagaya et al. | |

FOREIGN PATENT DOCUMENTS

| | | | |
|---|---|---|---|
| CN | 101660154 A | 3/2010 | |
| CN | 101663419 A | 3/2010 | |
| DE | 480995 C | 8/1929 | |
| EP | 1703000 A1 | 9/2006 | |
| EP | 1950325 A2 | 7/2008 | |
| GB | 2059445 A | 4/1981 | |
| GB | 2070073 A | 9/1981 | |
| JP | 5544504 A | 3/1980 | |
| JP | 3227721 B2 | 11/2001 | |
| JP | 2002030460 A | 1/2002 | |
| JP | 2002053975 A | 2/2002 | |
| JP | 2002519586 A | 7/2002 | |
| JP | 2003201576 A | 7/2003 | |
| JP | 2004183015 A | 7/2004 | |
| JP | 2004211137 A | 7/2004 | |
| JP | 2005264230 A | 9/2005 | |
| JP | 2010270373 A | * 12/2010 | ............ B32B 15/04 |
| JP | 201353326 A | 6/2013 | |
| JP | 5299084 B2 | 9/2013 | |
| WO | 0186016 A2 | 11/2001 | |
| WO | 2010064659 A1 | 6/2010 | |

OTHER PUBLICATIONS

Dickey, J.R.; Lubrication and Lubricants, 2005, p. 1-83.*
Gonen, M., et al.; Industrial Engineering Chemical Research, 2005, vol. 44, p. 1627-1633.*
International Search Report for PCT/JP2014/076783, dated Dec. 22, 2014, 2 pages. All references cited in the International Search Report are listed herein.
Supplementary European Search Report for EP 14856147, May 23, 2017.

* cited by examiner

*Primary Examiner* — Robert S Jones
(74) *Attorney, Agent, or Firm* — Mary K. Cameron

(57) ABSTRACT

A non-phosphorus chemical conversion treatment agent and treatment liquid for plastic working are provided, with reduced environmental impact, which are able to form films that are excellent in lubricity and corrosion resistance after plastic working by achieving large film thicknesses even in a system containing a salt of molybdic acid as its main constituent. An exemplary non-phosphorus chemical conversion treatment agent for plastic working is an agent containing a molybdic acid component (A), an acid component (B), and an aqueous medium (C), which is characterized in that the (B) comprises at least an organic acid component (B1) having at least one group selected from a carboxyl group and a phenolic hydroxyl group.

12 Claims, No Drawings

NON-PHOSPHORUS CHEMICAL CONVERSION TREATMENT AGENT AND TREATMENT LIQUID FOR PLASTIC WORKING, CHEMICAL CONVERSION FILM, AND METAL MATERIAL WITH CHEMICAL CONVERSION FILM

TECHNICAL FIELD

The present invention relates to a chemical conversion-type surface treatment agent and treatment liquid for a metal surface to be subjected to plastic working, a treatment film, and a metal substrate with the treatment film formed, and more particularly, a chemical conversion treatment agent and treatment liquid containing no phosphorus, which provides excellent lubricity, corrosion resistance, and corrosion resistance after processing as a base film of a lubricant for cold forging, cold heading, and wire drawing, a treatment film, and a metal substrate with the treatment film formed.

BACKGROUND ART

Conventionally, in cold plastic working such as wire drawing, tube drawing, and forging for metal materials such as iron and steel, galvanized steel, stainless steel, copper, aluminum, and titanium, films are formed on surfaces of metal materials for the purposes of preventing seizure and galling between materials to be processed and tools, further retaining lubricants, and improving introduction properties. For example, in bolt header processing, a film is formed on the surface of a steel wire, thereafter, a lubricant containing a metal soap powder or calcium hydroxide as its main constituent, an oil or a wax is applied thereto, wire drawing is carried out while retaining the lubricant on the film, and thereafter, the header processing is carried out. Further, for this film formation treatment, there are methods for forming a film by a chemical reaction, and methods for physically depositing a film.

The methods of using a chemical reaction in the formation of a film are referred to as chemical conversion treatment methods, which are typified by phosphate treatment methods for forming zinc phosphate films or calcium phosphate films, and oxalate treatment methods for forming iron oxalate films. In general, chemical conversion films have favorable adhesion to material surfaces, and can follow extended surfaces of materials to be processed, thus prevent seizure between the materials to be processed and tools, and provide long tool lives because frictional forces can be reduced, and also have corrosion resistance. However, in the chemical conversion treatment methods, large amounts of sludge produced by chemical reactions result in industrial wastes, and great effort and cost are required for disposal of the waste. In addition, large amounts of energy are required because the treatment temperatures are high temperatures.

In recent years, bolts for cars and building materials have been reduced in weight progressively from the viewpoint of cost and environment, and high-strength bolts have been frequently used. Films containing phosphorus are not able to be used for header processing of high-strength bolt materials in a strength classification of 12.9 or more. This is because when phosphorus being a film constituent remains after the header processing, phosphorus in zinc phosphate films is considered to go into steel during heat treatment, thereby causing brittle fracture. Therefore, for chromium-molybdenum steel such as SCM435, the use of lubricant films containing phosphorus such as zinc phosphate requires peeling with acid or alkali. In addition, in recent years, even for boron steel and so on for use in a strength classification of 10.9 or more, non-phosphorus lubricants are used with concern about the influence of phosphatizing, and the importance of non-phosphorus lubricants has been increased.

For non-phosphorus chemical conversion treatment, there are oxalate treatment methods with iron oxalate as films. The oxalate treatment is likely to generate rust during storage, and inferior in corrosion resistance. In addition, the oxalate falls under the category of deleterious substances, and care should be thus taken in method of storage.

On the other hand, there are lime soaps, borax, and the like as non-phosphorus lubricants for the physical application of films. While the liquid management is simple for chemical conversion treatment liquids, films therefrom are not sufficient in lubricity and corrosion resistance. Furthermore, in the lime soap treatment, films are likely to be peeled, and thus likely to become dust, thereby causing deterioration of the work environment and degradation of the lubricity. Borax, which is highly likely to absorb moisture, has the possibility of causing degradation of the lubricity in high-humidity environments. In addition, these application-type lubricants have insufficient corrosion resistance after processing, and thus has the problem of generating rust because of the retention of a material. In addition, in recent years, among application-type lubricants, there are lubricants which have excellent workability. Patent Literature 1 discloses an aqueous compound for the formation of protective films, which is characterized in that the compound contains an aqueous inorganic salt and a smectite clay mineral. This compound has workability either equaling or surpassing zinc phosphate films, but inferior corrosion resistance as compared with zinc phosphate, and when a large number of complexly shaped articles is subjected to immersion treatment at a time, locations with no film formed are produced without being able to achieve uniform application, thereby decreasing the corrosion resistance and the workability.

As just described, the zinc phosphate chemical conversion has an excellent ability to deposit uniform films, lubricity, and corrosion resistance, but discharges industrial wastes and uses large amounts of thermal energy. In addition, in the field where the use of phosphorus is regulated, most of reaction-type non-phosphorus lubricants are substantially only oxalates, which are significantly inferior in corrosion resistance, and thus small in amount used, and the use of application-type films has problems with uniform application to complexly shaped articles, corrosion resistance after working, and lubricity. Thus, the uniform deposition of non-phosphorus lubricant film has been required.

On the other hand, for forming uniform films on complexly shaped articles, reaction-type chemical conversion treatment of forming a film by reaction with a material is superior as compared with the application treatment. The non-phosphorus reaction-type chemical conversion treatment has been studied in the field of pre-coating treatment, where zirconium, titanium, and the like, and oxides of molybdenum are formed as films (Patent Literatures 2 to 4).

PRIOR ART LITERATURE

Patent Literature

Patent Literature 1: JP Application No. 2002-519586
Patent Literature 2: JP 2013-53326 A
Patent Literature 3: JP 2005-264230 A
Patent Literature 4: JP SHO-55-44504 A

SUMMARY OF INVENTION

Technical Problem

Among the foregoing, reaction-type chemical conversion treatment agents with salts of molybdic acid as described in Patent Literature 4 have excellent effluent treatment ability as compared with zinc phosphate chemical conversion treatment agents. In this regard, films formed with the reaction-type chemical conversion treatment agent described in Patent Literature 4 are small in thickness, but sufficient for the intended use in Patent Literature 4 (improvement in corrosion resistance from before to after coating), even with the small film thickness. However, in a case for plastic working, when the film thickness is small as in Patent Literature 4, the films fail to follow the increase in surface area, which is caused in the plastic working, thereby resulting in failure to achieve lubricity and corrosion resistance after processing.

Therefore, an object of the present invention is to provide a non-phosphorus chemical conversion treatment agent and treatment liquid for plastic working, with environmental impacts reduced, which are able to form films that are excellent in lubricity and corrosion resistance after plastic working by achieving large film thicknesses even in a system containing a salt of molybdic acid as its main constituent.

Solution to Problem

The inventors have found, as a result of earnest research for solving the problem mentioned above, with specific components blended, a non-phosphorus chemical conversion treatment agent and treatment liquid for plastic working with a salt of molybdic acid, which can achieve large film thicknesses, thereby completing the present invention. Specific aspects are as follows.

The present invention provides a non-phosphorus chemical conversion treatment agent or treatment liquid for plastic working, containing a molybdic acid component (A), an acid component (B), and an aqueous medium (C), which is characterized in that the (B) contains at least an organic acid component (B1) having at least one group selected from a carboxyl group and a phenolic hydroxyl group.

In this regard, the (B1) may have a pKa value of 5 or less.

In addition, the (B1) may further have an amino group.

Furthermore, the (B1) may include one or more selected from the group consisting of a carboxylic acid, an aminocarboxylic acid, a hydroxy acid, catechols, ascorbic acid, and salts thereof.

In addition, the (B1) may include one or more selected from the group consisting of EDTA, NTA, HEDTA, DTPA, EDDA, GEDTA, CyDTA, HIDA, TTHA, malic acid, tartaric acid, citric acid, oxalic acid, azelaic acid, aspartic acid, maleic acid, malonic acid, lactic acid and ascorbic acid, catechol, tiron, and salts thereof.

In addition, the molar ratio of the molybdic acid amount to the total amount of the carboxyl group and phenolic hydroxyl group {(molybdic acid)/(total of carboxyl group and phenolic hydroxyl group)} may be 0.01 to 800 in the agent.

Furthermore, the agent or liquid may further contain a metal component (D) of at least one selected from aluminum, zinc, calcium, iron, manganese, magnesium, and cobalt.

In addition, the molar ratio of the (A) to the (D) {the (A)/the (D)} may be 0.3 to 200.

Furthermore, the present invention provides a chemical conversion film obtained by using the non-phosphorus chemical conversion treatment liquid for plastic working.

In addition, the present invention provides a metal material with the chemical conversion film.

In this regard, the metal material may further have a lubricant layer on the chemical conversion film.

Furthermore, the present invention provides a method for producing a metal material with a chemical conversion film, the method including a chemical conversion treatment step of treating a metal material with the non-phosphorus chemical conversion treatment liquid for plastic working, thereby forming a chemical conversion film on the metal material.

In this regard, the production method may include a step of applying a lubricant onto the chemical conversion film after the chemical conversion treatment step.

Advantageous Effects of Invention

The present invention makes it possible to provide a non-phosphorus chemical conversion treatment agent and treatment liquid for plastic working, with environmental impacts reduced, which are able to form films that are excellent in lubricity and corrosion resistance after plastic working by achieving large film thicknesses even in a system containing a salt of molybdic acid as its main constituent.

Furthermore, according to the present invention, because of containing no phosphorus, phosphatizing is not caused which may occur in heat treatment, thus making it possible to prevent delayed fractures of metal materials and metallic processed materials. In addition, the generation of by-products is reduced in the treatment, and low-temperature treatment is possible as compared with conventional phosphate treatment. Therefore, since it becomes possible to reduce energy and industrial wastes, reducing the effort and cost which have been used is expected.

DESCRIPTION OF EMBODIMENTS

Embodiments of the present invention will be described below in the following order.
(1) Non-Phosphorus Chemical Conversion Treatment Agent and Treatment Liquid for Plastic Working
(2) Method for Producing the Treatment Agent and the Treatment Liquid
(3) Method for Using the Treatment Liquid (Method for Producing Metal Material with Chemical Conversion Film)
(4) Film Formed by use of the Treatment Liquid
(5) Metal Material with the Film Formed (1) Non-Phosphorus Chemical Conversion Treatment Agent and Treatment Liquid for Plastic Working The present invention provides a non-phosphorus chemical conversion treatment agent and treatment liquid for plastic working, containing a molybdic acid component (A), an acid component (B), and an aqueous medium (C), characterized in that the (B) includes at least an organic acid component (B1) having at least one group selected from a carboxyl group and a phenolic hydroxyl group. A film generated with this treatment liquid is a composite film of a molybdenum oxide and a salt of molybdic acid. The former molybdenum oxide is produced by a so-called redox reaction, where a material is etched by the acid component (B), thereby reducing the molybdic acid. On the other hand, the latter salt of molybdic acid is produced by a material likewise etched by the acid component (B), which increases the pH at a material interface, thereby making the salt of molybdic acid insoluble. Accordingly, uniformly etching the material and continuing the etching are crucially important factors for obtaining a sufficient film thickness. In this regard, the "non-phosphorus chemical conversion treatment agent for plastic working" means, in consideration of both the transport of the treatment agent and the workability in the supplementation of the agent at a line, a condensed treatment liquid which is intended to be used as a mother liquid (make-up agent) in make-up of the treatment liquid at a predetermined concentration. On the other hand, the chemical conversion treatment liquid means a liquid that is used for actually forming a film in contact with a material by immersion or spray treatment. In addition, the "non-phosphorus" means no phosphorus contained intentionally, but as long as phosphorus of 10 mg/L or less as an impurity or contamination from previous steps is not problematic, because the phosphorus is not contained in a film even when the phosphorus is mixed in the agent. The respective components, the abundance ratios of the respective components, and the liquid properties will be described in sequence.

«Components»

<Component A>

The non-phosphorus chemical conversion treatment agent and treatment liquid for plastic working according to the present invention include a molybdic acid component (A). The "molybdic acid component" herein refers to a molybdic acid and salts thereof.

<Component B>

The non-phosphorus chemical conversion treatment agent and treatment liquid for plastic working according to the present invention contain an acid component (B). Further, the acid component (B) includes at least an organic acid component (B1) having at least one group selected from a carboxyl group and a phenolic hydroxyl group. The "carboxyl group" herein refers to a carboxyl group and salts thereof (—COOM1: M1 represents a metal atom or an atom group that can form a salt with a carboxylic acid). Likewise, the "phenolic hydroxyl group" refers to a hydroxyl group bonded to an aromatic ring such as a benzene ring or a naphthalene ring, and salts thereof (—OM2: M2 represents a metal atom or an atom group that can form a salt with a phenolic hydroxyl group). It is to be noted that the non-phosphorus chemical conversion treatment agent and treatment liquid for plastic working according to the present invention may contain only one type of organic acid component (B1) or two or more types of organic acid components. The organic acid component has, as compared with inorganic acids, a great pH buffering action, and this action can stabilize the pH of the treatment liquid. Therefore, as compared with inorganic acids, a material is etched in a uniform and stable manner, thus making it possible to increase the thickness of a film.

In this regard, in order to exert a great pH buffering action, the organic acid component (B1) preferably has a pKa value of 5 or less, further preferably 4 or less. It is to be noted that the lower limit is not particularly limited, but preferably 1 or more. Within the appropriate range, a film turns into a thick one, thereby making it possible to use as a plastic working application. Specifically, the component preferably includes one or more selected from the group consisting of a carboxylic acid, an aminocarboxylic acid, a hydroxy acid, and an ascorbic acid. More specifically, the component may include one or more selected from the group consisting of EDTA (pKa2=1.5, pKa3=2.0, pKa4=2.68), NTA (pKa2=1.8, pKa3=2.48), HEDTA (pKa3=2.6), DTPA (pKa4=1.82, pKa5=2.65, pKa6=4.28), EDDA (pKa1=1.66, pKa2=2.37), GEDTA (pKa3=2.0, pKa4=2.66), CyDTA (pKa3=2.42, pKa4=3.53), HIDA (pKa2=2.2), TTHA (pKa5=2.4, pKa6=2.7), malic acid (pKa1=3.24, pKa2=4.71), tartaric acid (pKa1=2.82, pKa2=3.95), citric acid (pKa1=2.87, pKa2=4.35), oxalic acid (pKa1=1.04, pKa2=3.82), azelaic acid (pKa1=4.39), aspartic acid (pKa1=1.93, pKa2=3.70), maleic acid (pKa1=1.75), malonic acid (pKa1=2.65), lactic acid (pKa1=3.66), and L-ascorbic acid (pKa1=4.03). It is to be noted that the pKa values in the present invention are those in the 3rd Edition Chemical Handbook-Basic Edition II (The Chemical Society of Japan).

Furthermore, the organic acid component (B1) preferably has a high ability to form a complex between the component and a metal component eluted from an object metal that forms a film. This is for preventing adverse effects (inhibition of film formation, sludge generation, etc.) caused by the eluted metal. Also from this perspective, the carboxyl group or phenolic hydroxyl group of the organic acid component (B1) has such property. Specific examples of the organic acid component (B1) which has such property can include catechols, in addition to the foregoing. Specifically, the examples can include catechol and tiron.

In light of the foregoing, organic acid components (B1) particularly preferred have pKa of 1 to 5, and have a high ability to form a complex between the components and a metal component eluted from an object metal that forms a film. From this perspective, the organic acid components (B1) particularly preferred include EDTA, tartaric acid, citric acid, malic acid, lactic acid, NTA, HEDTA, DTPA, EDDA, GEDTA, CyDTA, HIDA, and TTHA.

The non-phosphorus chemical conversion treatment agent and treatment liquid for plastic working according to the present invention may contain, as the acid component (B), acids other than the acid components (B1) mentioned above, for example, inorganic acids, for example, for the purpose of pH adjustment. In this regard, the inorganic acids can include nitric acid, sulfuric acid, hydrochloric acid, hydrofluoric acid, and boric acid.

<Component D>

The non-phosphorus chemical conversion treatment agent and treatment liquid for plastic working according to the present invention may further contain a metal component (D) of at least one selected from zinc, aluminum, calcium, iron, manganese, magnesium, and cobalt. Containing these metals can increase film thickness, and further improve corrosion resistance after plastic working. As the reason therefor, it is understood that oxides and/or hydroxides of the metals are formed, and additionally, poorly-soluble salts are formed between the metals and molybdic acids, and these components constitute some of film constituents. Among these metals, zinc and aluminum are particularly preferred.

The non-phosphorus chemical conversion treatment agent and treatment liquid for plastic working according to the present invention has water entirely or mostly as a liquid medium.

«Abundance Ratio»

<Component Ratio 1>

In the non-phosphorus chemical conversion treatment agent and treatment liquid for plastic working according to the present invention, the molar ratio of the molybdic acid amount to the total amount of a carboxyl group and a phenolic hydroxyl group {(molybdic acid)/(total of carboxyl group and phenolic hydroxyl group)} is preferably 0.01 to 800, more preferably 0.03 to 400, and further preferably 0.06 to 200. When the molar ratio is higher than 800, a shortage of acid component results in no etching caused, thus making it difficult to obtain a film thickness that can withstand plastic working. Alternatively, the ratio less than 0.01 makes an etching reaction of a material dominant, thereby making it difficult to form a film. In this regard, in a method for measuring the molybdic acid amount in the agent, the organic acid is removed by acid decomposition, and the molybdenum amount is measured by ICP, and from the value, the molybdic acid amount can be calculated. In addition, in a method for measuring the carboxyl group amount in the agent, a separated quantitative determination is made by, for example, capillary electrophoresis. Furthermore, in a method for measuring the phenolic hydroxyl group in the agent, for example, the absorption of ultraviolet at 254 nm by the phenolic hydroxyl group can be used to make a fractional quantitative determination with the use of high-performance liquid chromatograph.

<Component Ratio 2>

In the non-phosphorus chemical conversion treatment agent and treatment liquid for plastic working according to the present invention, the molar ratio of the (A) to the (D) {the (A)/the (D)} is preferably 0.3 to 200, more preferably 0.5 to 100, and further preferably 1 to 60. In this regard, as for the molar ratio, in a method for measuring the amount of metal (D) in the agent, the amount can be determined by ICP after removing the organic acid by acid decomposition.

«Liquid Property»

The non-phosphorus chemical conversion treatment liquid for plastic working according to the present invention preferably has pH of 1 to 5, more preferably 2.5 to 4.5. In the case of the pH range, as a result of exerting the buffering ability of the organic acid component (B1), the object metal is continuously etched, and thickness of the film can be thus increased. In this regard, in a method for measuring the pH, a commonly marketed pH meter can be calibrated in the acid region to measure the pH.

(2) Method for Producing the Treatment Agent and the Treatment Liquid

The non-phosphorus chemical conversion treatment agent and treatment liquid for plastic working according to the present invention can be produced by adding predetermined raw materials into water, and mixing and agitating the materials. The raw materials used will be described in detail below.

<Raw Material for Component A>

The source for the molybdic acid component (A) is preferably a water-soluble salt of molybdic acid, and examples thereof can include ammonium molybdate, lithium molybdate, potassium molybdate, and sodium molybdate.

<Raw Material for Component B>

Sources for the acid component (B), in particular, sources for the organic acid component (B1) can include, for example, EDTA, NTA, HEDTA, DTPA, EDDA, GEDTA, CyDTA, HIDA, TTHA, malic acid, tartaric acid, citric acid, oxalic acid, azelaic acid, aspartic acid, maleic acid, malonic acid, lactic acid, ascorbic acid, catechol, tiron, and salts thereof. The salts are, for example, a sodium salt, a potassium salt, and a lithium salt as alkali-metal salts.

<Raw Material for Component D>

Sources for the component (D) can include, for example, nitrates, sulfates, oxides, acetates, or fluorides of metals.

<Method for Using Treatment Agent>

In addition, the non-phosphorus chemical conversion treatment agent for plastic working according to the present invention is an aqueous solution of the treatment liquid concentrated to 2 to 200 times. In actual chemical conversion treatment, the non-phosphorus chemical conversion treatment agent for plastic working is appropriately diluted with water to prepare (make-up) the treatment liquid. In that regard, the concentration, pH, treatment time, and treatment temperature may be determined so that the chemical conversion film has a preferred film thickness.

<Method for Using Treatment Liquid>

The concentration of the molybdic acid (A) in the treatment liquid is preferably 0.2 to 150 mmol/L, further preferably 0.5 to 100 mmol/L. Within the appropriate range, the thickness of the film is further increased to secure the following performance of the film in plastic working. In addition, a film can be uniformly formed as long as the concentration of the organic acid (B1) in the treatment liquid is 0.05 mmol/L or higher, and the concentration is desirably 50 mmol/L or lower in consideration of effluent treatment. Furthermore, the concentration of the metal (D) in the treatment liquid is preferably 0.03 to 50 mmol/L, more preferably 0.06 to 30 mmol/L. This is because, within the appropriate range, the thickness of the film is further increased to further improve the corrosion resistance and the lubricity.

(3) Method for Using the Treatment Liquid (Method for Producing Metal Material with Chemical Conversion Film)

The non-phosphorus chemical conversion treatment liquid for plastic working according to the present invention can be used in treatment for providing a chemical conversion film on a metal material. The metal material as an object on which a chemical conversion film is to be provided, and a method for using the non-phosphorus chemical conversion treatment liquid for plastic working (a method for producing a metal material with a chemical conversion film) will be described in sequence below.

«Metal Material»

The metal material as an object on which a chemical conversion film is to be provided is not particularly limited, but preferably an iron-based material. Carbon steel, boron steel, chromium-molybdenum steel, SUJ2, or the like is preferred as a more specific example.

«Method for Using Treatment Liquid (Method for Producing Metal Material with Chemical Conversion Film)»

(Chemical Conversion Treatment Step)

The method for producing a metal material with a chemical conversion film includes a chemical conversion treatment step of immersing a metal material in the non-phosphorus chemical conversion treatment liquid for plastic working according to the present invention, thereby forming a chemical conversion film on the metal material. In this regard, the temperature of the non-phosphorus chemical conversion treatment liquid for plastic working according to the present invention is not particularly limited, but preferably 30 to 80° C., more preferably 40 to 60° C. in terms of energy cost and treatment time. As just described, energy saving and cost reduction are expected as a result of allowing the temperature of the treatment liquid to be lowered as compared with zinc phosphate treatment.

(Lubricant Application Step)

The method for producing a metal material with a chemical conversion film preferably further includes a step of applying a lubricant on the chemical conversion film after the chemical conversion treatment. As just described, when a lubricant is further applied onto the chemical conversion film, a two-layer film is formed which has excellent lubricity. In this regard, the lubricant is not particularly limited, but examples thereof include, for example, commonly marketed lubricants as typified by lime soaps, one-step lubricants, and oils, extreme-pressure additives, waxes, polytetrafluoroethylene, fatty acids and salts thereof, fatty acid amides, molybdenum disulfide, tungsten disulfide, graphite, melamine cyanurate, organic-treated synthetic mica, layered-structure amino-acid compounds. In addition, one of the lubricants may be used, or two or more thereof may be used in combination.

(4) Film Formed by Use of the Treatment Liquid
(Film Thickness)

The film amount of the chemical conversion film formed with the use of the non-phosphorus chemical conversion treatment liquid for plastic working according to the present invention is preferably 0.4 to 10 μm, more preferably 0.6 to 5 μm, and further preferably 0.7 to 3 μm in consideration of cost and generation of a film residue dropping from a substrate in forging, while securing high corrosion resistance and lubricity. The concentration, treatment time, treatment temperature, and pH of non-phosphorus chemical conversion treatment liquid for plastic working are appropriately adjusted and used so that the film thickness falls within these ranges.

(Composition)

The chemical conversion film formed with the use of the non-phosphorus chemical conversion treatment liquid for plastic working according to the present invention is an amorphous film that contains, as its main constituents, an oxide and/or hydroxide of molybdenum, and a salt of molybdic acid and metal (metal that forms a film). The former contributes high lubricity, whereas the latter contributes high corrosion resistance.

Furthermore, when the non-phosphorus chemical conversion treatment liquid for plastic working according to the present invention further contains the metal component (D), the chemical conversion film further contains an oxide and/or a hydroxide of the metal component (D), and a salt of molybdic acid and the metal component (D).

(5) Metal Material with the Film Formed

The metal material with the chemical conversion film formed with the use of the non-phosphorus chemical conversion treatment liquid for plastic working according to the present invention is particularly useful as a material for plastic working, for cold forging, cold heading, and wire drawing. When the metal material is subjected to plastic working, lubricity, corrosion resistance, and corrosion resistance after working can be achieved.

EXAMPLES

The present invention will be more specifically described below with reference to examples.

«Non-Phosphorus Chemical Conversion Treatment Agent and Treatment Liquid for Plastic Working»

Non-phosphorus chemical conversion treatment liquids for plastic working according to the present examples were prepared in accordance with Table 1. The pH adjustment was made appropriately with the inorganic acids listed in Table 1.

Here are treatment liquids according to comparative examples.

(Comparative Example 1) No chemical conversion treatment was carried out.
(Comparative Example 2) An aqueous solution of 20% borax was warmed to 70° C., and subjected to immersion treatment for 1 minute.
(Comparative Example 3) Zinc phosphate treatment was carried out with the use of zinc phosphate treatment agent: PALBOND 181X (90 g/L) from NIHON PARKERIZING CO., LTD. Further, at the treatment temperature of 80° C., 0.45 g/L of an accelerator 131 was added immediately before the treatment, and the treatment was carried out for 10 minutes.
(Comparative Example 4) Sodium molybdate was dissolved in water for 82.6 mmol/L to provide a treatment liquid.
(Comparative Example 5) Ammonium molybdate was dissolved in water for 16.2 mmol/L to provide a treatment liquid.

«Film Formation Method»

Commercially available cylindrical S45C subjected to spheroidizing annealing was adopted as test materials. These test materials were subjected to alkali degreasing (with the use of FINECLEANER E6400 from NIHON PARKERIZING CO., LTD.; concentration: 20 g/L, temperature: 60° C., immersion time: 10 min), water rinsing (ordinary temperature, immersion time: 60 sec), acid cleaning (with the use of hydrochloric acid; concentration: 17.5 mass %, ordinary temperature, immersion time: 10 min), and water rinsing (ordinary temperature, immersion time: 60 sec), thereby cleaning the surface. Thereafter, the treatment liquids shown in Tables 2A to 2E were warmed to the temperature shown in Table 1, and the test materials were immersed therein to carry out treatment. Thereafter, cross sections of the treated films were cut out, and the film thicknesses were measured by image analysis.

«Evaluation»

<Lubricity Evaluation>

To carbon steel, a lubricant was applied after the chemical conversion treatment, and the lubricity was evaluated by a spike test.

For Example 1 to Example 36 and Comparative Example 1 to Comparative Example 5, a lubricant from NIHON PARKERIZING CO., LTD., containing a lime soap as its main constituent: PALUBE-CAO2 was, as a lubricant, deposited at 7 g/m2 for upper layers after the formation of the films. In addition, for Examples 37 to 43, a polyethylene wax was, as a lubricant, deposited at 3 g/m2 after the formation of the films. The spike test was carried out in accordance with the invention in Japanese Patent No. 3227721, thereby visually evaluating how the films follow to protrusions of test pieces after the processing, and the presence or absence of seizure part. Favorable following performance provides adequate seizure resistance to the increase in surface area in cold plastic working, while seizure is more likely to be caused when the film fails to follow. The lubricity was evaluated in accordance with the following evaluation criteria. The results are shown in Tables 2A to 2E.

⊚: the film which followed to the protrusion, without part seizure
◯: the film which failed to follow to the protrusion, without part seizure
Δ: the film which failed to follow to the protrusion, with a slight part seizure part
x: the film which failed to follow to the protrusion, with severe part seizure part <Corrosion Resistance>

The work evaluated for lubricity and unprocessed work were evaluated for corrosion resistance. The evaluation was made with the number of days until rust formation at 5% of the surface exposed indoors. The work evaluated as Δ or better is practicable.

Evaluation Criteria
⊚: 21 days or more
◯: 14 days or more and less than 21 days
Δ: 7 days or more and less than 14 days
x: less than 7 days <Presence or Absence of Sludge>

As for sludge, a cold-rolled steel sheet was treated with 1 L of the treatment liquid, and sludge at treatment of 0.21 m2 was evaluated with visual appearances.

○: no sludge generated
x: sludge generated

<Delayed Fracture Characteristics>

As for delayed fracture characteristics, a film was formed on SCM435, and subjected to heat treatment at 900° C. for 60 minutes in a nitrogen-atmosphere furnace. A cross section was polished, immersed in Nital reagent (3% concentrated nitric acid-ethyl alcohol solution) at 50° C., and analyzed near the surface layer with a metallograph. Phosphatizing changes the color near the bolt surface to a white color.

○: no color change
x: color change

Examples 1 to 43 have achieved a film thickness from 0.4 μm to 1.4 μm, and also favorable lubricity and corrosion resistance before and after the processing. In addition, the examples have also achieved favorable delayed fracture characteristics, without any sludge generated. Comparative Example 1 is a conventional non-phosphorus application-type lubricant without any sludge generated, which is, however, insufficient in lubricity and corrosion resistance. Comparative Example 2 has borax as a base film, which is, however, not sufficient in both lubricity and corrosion resistance. Comparative Example 3 is a conventional zinc phosphate film, which exhibits sufficient lubricity and corrosion resistance, but has sludge generated, and inferior delayed fracture characteristics. Comparative Examples 4 and 5 correspond to examples described in Patent Literature 4, which depart from the scope of the present patent, without containing any organic acid. Therefore, the comparative examples have failed to obtain any sufficient film thickness, which are not sufficient in lubricity and corrosion resistance after the processing.

TABLE 1A

| | Components in Processing Liquid | | | | | | pH | |
|---|---|---|---|---|---|---|---|---|
| | Molybdic Acid A | Conc. | Organic Acid B | Conc. | Metal Salt D | Conc. | Adjuster | pH |
| Ex. 1 | Ammon. Molybdate | 20.8 | Sodium Tartrate | 1.33 | | | $HNO_3$ | 3 |
| Ex. 2 | Ammon. Molybdate | 20.8 | EDTA•2Na | 0.68 | | | $H_2SO_4$ | 3 |
| Ex. 3 | Sodium Molybdate | 20.8 | NTA•Na | 1.05 | | | $HNO_3$ | 2 |
| Ex. 4 | Potassium Molybdate | 20.8 | HEDTA | 0.53 | | | $HNO_3$ | 3 |
| Ex. 5 | Ammon. Molybdate | 20.8 | Malic Acid | 1.49 | | | $HNO_3$ | 3 |
| Ex. 6 | Lithium Molybdate | 20.8 | Ammonium Citrate | 1.04 | | | $HNO_3$ | 3 |
| Ex. 7 | Ammon. Molybdate | 20.8 | Oxalic Acid | 1.59 | | | $HNO_3$ | 3 |
| Ex. 8 | Ammon. Molybdate | 20.8 | Azelaic Acid | 1.06 | | | $HNO_3$ | 3 |
| Ex. 9 | Ammon. Molybdate | 20.8 | Catechol | 2.00 | | | $HNO_3$ | 5 |
| Ex. 10 | Ammon. Molybdate | 20.8 | Tiron | 0.62 | | | $HNO_3$ | 5 |
| Ex. 11 | Sodium Molybdate | 10.4 | Sodium Tartrate | 6.67 | | | $H_2SO_4$ | 3 |
| Ex. 12 | Lithium Molybdate | 20.8 | Sodium Tartrate | 0.07 | | | $HNO_3$ | 3 |
| Ex. 13 | Lithium Molybdate | 5.2 | Sodium Tartrate | 33.4 | | | $H_2SO_4$ | 3 |
| Ex. 14 | Lithium Molybdate | 104 | Sodium Tartrate | 0.14 | | | $HNO_3$ | 3 |
| Ex. 15 | Lithium Molybdate | 0.400 | Sodium Tartrate | 20.0 | | | $HNO_3$ | 3 |
| Ex. 16 | Lithium Molybdate | 146 | Sodium Tartrate | 2.58 | | | $HNO_3$ | 3 |
| Ex. 17 | Lithium Molybdate | 208 | Sodium Tartrate | 0.104 | | | $HNO_3$ | 3 |
| Ex. 18 | Ammon. Molybdate | 20.8 | Sodium Tartrate | 1.33 | Alumin. Nit. | 7.41 | $HNO_3$ | 3 |
| Ex. 19 | Ammon. Molybdate | 20.8 | EDTA•2Na | 6.67 | Alumin. Nit. | 7.41 | $NH_3$ | 3 |
| Ex. 20 | Ammon. Molybdate | 20.8 | NTA | 0.07 | Alumin. Nit. | 7.41 | $NH_3$ | 3 |
| Ex. 21 | Ammon. Molybdate | 20.8 | HEDTA | 10.0 | Alumin. Sul. | 7.41 | $NH_3$ | 3 |
| Ex. 22 | Ammon. Molybdate | 20.8 | Malic Acid | 0.13 | Alumin. Nit. | 7.41 | $NH_3$ | 3 |
| Ex. 23 | Ammon. Molybdate | 20.8 | Citric Acid | 6.67 | Alumin. Sul. | 7.41 | $NH_3$ | 3 |
| Ex. 24 | Ammon. Molybdate | 20.8 | Oxalic Acid | 0.13 | Alumin. Nit. | 7.41 | $NH_3$ | 2 |
| Ex. 25 | Ammon. Molybdate | 20.8 | Azelaic Acid | 6.67 | Alumin. Nit. | 7.41 | $NH_3$ | 2 |
| Ex. 26 | Ammon. Molybdate | 20.8 | Catechol | 0.07 | Alumin. Nit. | 7.41 | $NH_3$ | 3 |

TABLE 1A-continued

| | Components in Processing Liquid | | | | | | pH | |
|---|---|---|---|---|---|---|---|---|
| | Molybdic Acid A | Conc. | Organic Acid B | Conc. | Metal Salt D | Conc. | Adjuster | pH |
| Ex. 27 | Ammon. Molybdate | 20.8 | Tiron | 0.62 | Alumin. Nit. | 7.41 | $NH_3$ | 3 |
| Ex. 28 | Ammon. Molybdate | 1.00 | Sodium Tartrate | 6.67 | Alumin. Nit. | 0.400 | $HNO_3$ | 3 |
| Ex. 29 | Ammon. Molybdate | 20.8 | Sodium Tartrate | 0.07 | Alumin. Nit. | 7.41 | $NH_3$ | 3 |
| Ex. 30 | Ammon. Molybdate | 2.00 | Sodium Tartrate | 33.4 | Alumin. Sul. | 0.74 | $NH_3$ | 3 |
| Ex. 31 | Sodium Molybdate | 20.8 | EDTA•2Na | 3.61 | Alumin. Sul. | 7.41 | $HNO_3$ | 3 |
| Ex. 32 | Ammon. Molybdate | 104 | Ammonium Citrate | 0.10 | Alumin. Nit. | 7.41 | $HNO_3$ | 3 |
| Ex. 33 | Ammon. Molybdate | 20.8 | Ammonium Citrate | 1.33 | Alumin. Nit. | 15.0 | $NH_3$ | 3 |
| Ex. 34 | Ammon. Molybdate | 20.8 | Ammonium Citrate | 1.33 | Alumin. Nit. | 3.50 | $HNO_3$ | 3 |
| Ex. 35 | Ammon. Molybdate | 20.8 | Sodium Tartrate | 1.33 | Alumin. Nit. | 30.0 | $NH_3$ | 3 |
| Ex. 36 | Ammon. Molybdate | 20.8 | Sodium Tartrate | 1.33 | Alumin. Nit. | 0.600 | $HNO_3$ | 3 |
| Ex. 37 | Ammon. Molybdate | 20.8 | Sodium Tartrate | 1.33 | Alumin. Sul. | 50.0 | $H_2SO_4$ | 2 |
| Ex. 38 | Ammon. Molybdate | 10.4 | Sodium Tartrate | 1.33 | Alumin. Nit. | 0.100 | $HNO_3$ | 3 |
| Ex. 39 | Ammon. Molybdate | 20.8 | EDTA•2Na | 6.67 | Alumin. Sul. | 3.50 | $HNO_3$ | 3 |
| Ex. 40 | Ammon. Molybdate | 20.8 | EDTA•2Na | 6.67 | Alumin. Fl. | 3.50 | HF | 3 |
| Ex. 41 | Ammon. Molybdate | 20.8 | EDTA•2Na | 6.67 | Zinc Nit. | 1.54 | $HNO_3$ | 3 |
| Ex. 42 | Ammon. Molybdate | 20.8 | EDTA•2Na | 6.67 | Zinc Nit. | 15.3 | $NH_3$ | 3 |
| Ex. 43 | Ammon. Molybdate | 20.8 | EDTA•2Na | 6.67 | Mag. Nit. | 8.23 | $HNO_3$ | 3 |
| C. Ex. 1 | No Chemical Film | | | | | | | |
| C. Ex. 2 | | | Borax (20 g/L) | | | | | |
| C. Ex. 3 | | | Palbond 181X (90 g/L), Accelerator 131 (0.45 g/L) | | | | | |
| C. Ex. 4 | Sodium Molybdate | 82.6 | | | | | | 7.4 |
| C. Ex. 5 | Ammon. Molybdate | 16.2 | | | | | $HNO_3$ | 4 |

Conc. = mmol/L

TABLE 2A

| | | | | Example | | | | |
|---|---|---|---|---|---|---|---|---|
| | | | | Ex. 1 | Ex. 2 | Ex. 3 | Ex. 4 | Ex. 5 |
| Processing Liquid Components | Comp. A | Component Molybdic Acid Conc. | | NHM 20.8 | NHM 20.8 | NaM 20.8 | KM 20.8 | NHM 20.8 |
| | Comp. B | Conc. (B1) | Comp. pKa Value Conc. FG Conc. | NaT pKa1 = 2.82 1.33 2.67 | EDTA•2Na pKa3 = 2.00 0.68 2.74 | NTA•Na pKa3 = 2.48 1.05 3.14 | HEDTA pKa3 = 2.6 0.53 1.58 | Malic pKa1 = 3.24 1.49 2.98 |
| | Comp. D | Component Conc. | | — — | — — | — — | — — | — — |
| | Comp. C | Component | | Water | Water | Water | Water | Water |
| | Comp. A/FG Mol. Ratio | | | 7.80 | 7.59 | 6.62 | 13.2 | 6.97 |
| | Comp. A/Comp. D Mol. Ratio | | | — | — | — | — | — |
| Coating | pH | | | 3 | 3 | 2 | 3 | 3 |
| | Coating Thickness (μm) | | | 1.2 | 1.2 | 1.1 | 1.1 | 1.1 |
| Evaluation | Lubrication | | | ⊙ | ⊙ | ⊙ | ⊙ | ⊙ |
| | Pre-Treat. Corrosion Resistance | | | ○ | ○ | ○ | ○ | ○ |
| | Post-Treat. Corrosion Resistance | | | ○ | ○ | ○ | ○ | ○ |

TABLE 2A-continued

|  |  | Ex. 1 | Ex. 2 | Ex. 3 | Ex. 4 | Ex. 5 |
|---|---|---|---|---|---|---|
| Sludge | | ○ | ○ | ○ | ○ | ○ |
| Phosphatizing | | ○ | ○ | ○ | ○ | ○ |
| Overall Evaluation | | ⊙ | ⊙ | ⊙ | ⊙ | ⊙ |

NHM: Ammonium molybdate,
NaM: Sodium molybdate,
KM: Potassium Molybdate,
NaT: Sodium Tartrate
Conc. = mmol/L,
FG: Functional group

|  |  |  |  | Example |  |  |  |  |
|---|---|---|---|---|---|---|---|---|
|  |  |  |  | Ex. 6 | Ex. 7 | Ex. 8 | Ex. 9 | Ex. 10 |
| Processing Liquid Components | Comp. A | Component | | LiM | NHM | NHM | NHM | NHM |
| | | Molybdic Acid Conc. | | 20.8 | 20.8 | 20.8 | 20.8 | 20.8 |
| | Comp. B | Conc. (B1) | Comp. | NHC | OA | M | Catechol | Tiron |
| | | | pKa Value | pKa1 = 2.87 | pKa2 = 3.82 | pKa1 = 4.39 | pKa1 = 9.23 | pKa1 = 7.31 |
| | | | Conc. | 1.04 | 1.59 | 1.06 | 2.00 | 0.62 |
| | | | FG Conc. | 3.12 | 3.17 | 2.13 | 4.00 | 1.24 |
| | Comp. D | Component Conc. | | — | — | — | — | — |
| | Comp. C | Component | | Water | Water | Water | Water | Water |
| | Comp. A/FG Mol. Ratio | | | 6.66 | 6.56 | 9.79 | 5.21 | 16.8 |
| | Comp. A/Comp. D Mol. Ratio | | | — | — | — | — | — |
| Coating | pH | | | 3 | 3 | 3 | 5 | 5 |
| | Coating Thickness (μm) | | | 1.0 | 0.9 | 0.8 | 0.6 | 0.6 |
| Evaluation | Lubrication | | | ⊙ | ⊙ | ○ | ○ | ○ |
| | Pre-Treat. Corrosion Resistance | | | ○ | ○ | ○ | ○ | ○ |
| | Post-Treat. Corrosion Resistance | | | ○ | ○ | ○ | Δ | Δ |
| | Sludge | | | ○ | ○ | ○ | ○ | ○ |
| | Phosphatizing | | | ○ | ○ | ○ | ○ | ○ |
| | Overall Evaluation | | | ⊙ | ⊙ | ⊙ | ○ | ○ |

LiM: Lithium molybdate,
NHM: Ammonium molybdate,
NHC: Ammonium citrate,
OA: Oxalic acid,
AA: Azelaic acid,
Conc. = mmol/L,
FG: Functional group

TABLE 2B

|  |  |  |  | Example |  |  |  |  |
|---|---|---|---|---|---|---|---|---|
|  |  |  |  | Ex. 11 | Ex. 12 | Ex. 13 | Ex. 14 | Ex. 15 |
| Processing Liquid Components | Comp. A | Component | | NaM | LiM | LiM | LiM | LiM |
| | | Molybdic Acid Conc. | | 10.4 | 20.8 | 5.2 | 104 | 0.4 |
| | Comp. B | Conc. (B1) | Comp. | NaT | NaT | NaT | NaT | NaT |
| | | | pKa Value | pKa1 = 2.82 | pKa1 = 2.82 | pKa1 = 2.82 | pKa1 = 2.82 | pKa1 = 2.82 |
| | | | Conc. | 6.67 | 0.07 | 33.4 | 0.14 | 20.0 |
| | | | FG Conc. | 13.3 | 0.14 | 66.7 | 0.27 | 40.0 |
| | Comp. D | Component Conc. | | — | — | — | — | — |
| | Comp. C | Component | | Water | Water | Water | Water | Water |
| | Comp. A/FG Mol. Ratio | | | 0.8 | 149 | 0.08 | 386 | 0.02 |
| | Comp. A/Comp. D Mol. Ratio | | | — | — | — | — | — |
| Coating | pH | | | 3 | 3 | 3 | 3 | 3 |
| | Coating Thickness (μm) | | | 0.9 | 1.1 | 0.6 | 0.6 | 0.4 |
| Evaluation | Lubrication | | | ⊙ | ⊙ | ○ | ○ | ○ |
| | Pre-Treat. Corrosion Resistance | | | ○ | ○ | ○ | ○ | ○ |
| | Post-Treat. Corrosion Resistance | | | ○ | ○ | ○ | ○ | Δ |

TABLE 2B-continued

|   |   |   |   |   |   |
|---|---|---|---|---|---|
| Sludge | ○ | ○ | ○ | ○ | ○ |
| Phosphatizing | ○ | ○ | ○ | ○ | ○ |
| Overall Evaluation | ⊙ | ⊙ | ○ | ○ | ○ |

NaM: Sodium molybdate,
LiM: Lithium molybdate,
NaT: Sodium tartrate
Conc. = mmol/L,
FG: Functional group

|   |   |   |   | Example | |
|---|---|---|---|---|---|
|   |   |   |   | Ex. 16 | Ex. 17 |
| Processing Liquid Components | Comp. A | Component Molybdic Acid Conc. | | LiM 146 | LiM 208 |
| | Comp. B | Conc. Comp. (B1) | Comp. pKa Value Conc. FG Conc. | NaT pKa1 = 2.82 2.58 5.15 | NaT pKa1 = 2.82 0.104 0.208 |
| | Comp. D | Component Conc. | | — — | — — |
| | Comp. C | Component | | Water | Water |
| | Comp. A/FG Mol. Ratio | | | 750 | 1000 |
| | Comp. A/Comp. D Mol. Ratio | | | — | — |
| Coating | pH | | | 3 | 3 |
| | Coating Thickness (μm) | | | 0.5 | 0.4 |
| Evaluation | Lubrication | | | ○ | ○ |
| | Pre-Treat. Corrosion Resistance | | | ○ | Δ |
| | Post-Treat. Corrosion Resistance | | | Δ | Δ |
| | Sludge | | | ○ | ○ |
| | Phosphatizing | | | ○ | ○ |
| | Overall Evaluation | | | ○ | Δ |

LiM: Lithium molybdate,
NaT: Sodium tartrate
Conc. = mmol/L,
FG: Functional group

TABLE 2C

|   |   |   | Example | | | | |
|---|---|---|---|---|---|---|---|
|   |   |   | Ex. 18 | Ex. 19 | Ex. 20 | Ex. 21 | Ex. 22 |
| Processing Liquid Components | Comp. A | Component Molybdic Acid Conc. | NHM 20.8 | NHM 20.8 | NHM 20.8 | NHM 20.8 | NHM 20.8 |
| | Comp. B | Conc. Comp. (B1) pKa Value Conc. FG Conc. | NaT pKa1 = 2.82 1.33 2.67 | EDTA·2Na pKa3 = 2.0 6.67 13.3 | NTA pKa3 = 2.48 0.07 0.14 | HEDTA pKa3 = 2.6 10 20 | Malic pKa1 = 3.24 0.13 0.27 |
| | Comp. D | Component Conc. | AlN 7.41 | AlN 7.41 | AlN 7.41 | AlS 7.41 | AlN 7.41 |
| | Comp. C | Component | Water | Water | Water | Water | Water |
| | Comp. A/FG Mol. Ratio | | 7.82 | 1.56 | 149 | 1.04 | 77.2 |
| | Comp. A/Comp. D Mol. Ratio | | 2.8 | 2.8 | 2.8 | 2.8 | 2.8 |
| Coating | pH | | 3 | 3 | 3 | 3 | 3 |
| | Coating Thickness (μm) | | 1.4 | 1.4 | 1.3 | 1.3 | 1.2 |
| Evaluation | Lubrication | | ⊙ | ⊙ | ⊙ | ⊙ | ⊙ |
| | Pre-Treat. Corrosion Resistance | | ⊙ | ⊙ | ⊙ | ⊙ | ⊙ |
| | Post-Treat. Corrosion Resistance | | ⊙ | ⊙ | ⊙ | ⊙ | ⊙ |

TABLE 2C-continued

|  |  |  |  |  |  |
|---|---|---|---|---|---|
| Sludge | ○ | ○ | ○ | ○ | ○ |
| Phosphatizing | ○ | ○ | ○ | ○ | ○ |
| Overall Evaluation | ⊙⊙ | ⊙⊙ | ⊙⊙ | ⊙⊙ | ⊙⊙ |

NHM: Ammonium molybdate,
NaT: Sodium tartrate,
AlN: Aluminum nitrate
AlS: Aluminum Sulfate
Conc. = mmol/L,
FG: Functional group

|  |  |  |  | Example | |
|---|---|---|---|---|---|
|  |  |  |  | Ex. 23 | Ex. 24 |
| Processing Liquid Components | Comp. A | Component | | NHM | NHM |
|  |  | Molybdic Acid Conc. | | 20.8 | 20.8 |
|  | Comp. B | Conc. Comp. (B1) | Comp. | Citric | Oxalic |
|  |  |  | pKa Value | pKa1 = 2.87 | pKa2 = 3.82 |
|  |  |  | Conc. | 6.67 | 0.13 |
|  |  |  | FG Conc. | 13.3 | 0.27 |
|  | Comp. D | Component | | AlS | AlN |
|  |  | Conc. | | 7.41 | 7.41 |
|  | Comp. C | Component | | Water | Water |
|  | Comp. A/FG Mol. Ratio | | | 1.56 | 77.2 |
|  | Comp. A/Comp. D Mol. Ratio | | | 2.8 | 2.8 |
| Coating | pH | | | 3 | 2 |
|  | Coating Thickness (μm) | | | 1.4 | 0.9 |
| Evaluation | Lubrication | | | ⊙ | ⊙ |
|  | Pre-Treat. Corrosion Resistance | | | ⊙ | ⊙ |
|  | Post-Treat. Corrosion Resistance | | | ⊙ | ○ |
|  | Sludge | | | ○ | ○ |
|  | Phosphatizing | | | ○ | ○ |
|  | Overall Evaluation | | | ⊙⊙ | ⊙ |

NHM: Ammonium molybdate,
AlN: Aluminum nitrate,
AlS: Aluminum Sulfate
Conc. = mmol/L,
FG: Functional group

TABLE 2D

|  |  |  |  | Example | | | | |
|---|---|---|---|---|---|---|---|---|
|  |  |  |  | Ex. 25 | Ex. 26 | Ex. 27 | Ex. 28 | Ex. 29 |
| Processing Liquid Components | Comp. A | Component | | NHM | NHM | NHM | NHM | NHM |
|  |  | Molybdic Acid Conc. | | 20.8 | 20.8 | 20.8 | 1.00 | 20.8 |
|  | Comp. B | Conc. Comp. (B1) | Comp. | Azelaic | Catechol | Tiron | NaT | NaT |
|  |  |  | pKa Value | pKa1 = 4.39 | pKa1 = 9.23 | pKa1 = 7.31 | pKa1 = 2.82 | pKa1 = 2.82 |
|  |  |  | Conc. | 6.67 | 0.07 | 0.62 | 6.67 | 0.07 |
|  |  |  | FG Conc. | 13.3 | 0.14 | 133 | 13.3 | 0.14 |
|  | Comp. D | Component | | AlN | AlN | AlN | AlN | AlN |
|  |  | Conc. | | 7.41 | 7.41 | 7.41 | 0.40 | 7.4 |
|  | Comp. C | Component | | Water | Water | Water | Water | Water |
|  | Comp. A/FG Mol. Ratio | | | 1.57 | 149 | 0.16 | 0.07 | 148.6 |
|  | Comp. A/Comp. D Mol. Ratio | | | 2.8 | 2.8 | 2.8 | 2.50 | 2.81 |
| Coating | pH | | | 2 | 3 | 3 | 3 | 3 |
|  | Coating Thickness (μm) | | | 0.8 | 0.8 | 0.7 | 1.4 | 1.2 |
| Evaluation | Lubrication | | | ⊙ | ⊙ | ⊙ | ⊙ | ⊙ |
|  | Pre-Treat. Corrosion Resistance | | | ⊙ | ⊙ | ⊙ | ⊙ | ⊙ |
|  | Post-Treat. Corrosion Resistance | | | ○ | ○ | ○ | ⊙ | ⊙ |

TABLE 2D-continued

| | | | | | |
|---|---|---|---|---|---|
| Sludge | ○ | ○ | ○ | ○ | ○ |
| Phosphatizing | ○ | ○ | ○ | ○ | ○ |
| Overall Evaluation | ⊙ | ⊙ | ⊙ | ⊙○ | ⊙○ |

NHM: Ammonium molybdate,
NaT: Sodium tartrate,
AlN: Aluminum nitrate
Conc. = mmol/L,
FG: Functional group

|  |  |  |  | Example | | |
|---|---|---|---|---|---|---|
|  |  |  |  | Ex. 30 | Ex. 31 | Ex. 32 |
| Processing Liquid Components | Comp. A | Component | | NHM | NaM | NHM |
| | | Molybdic Acid Conc. | | 2.00 | 20.8 | 104 |
| | Comp. B | Conc. (B1) | Comp. pKa Value | NaT pKa1 = 2.82 | EDTA•2Na pKa3 = 2.0 | NHC pKa1 = 2.87 |
| | | | Conc. | 33.4 | 3.61 | 0.1 |
| | | | FG Conc. | 66.5 | 14.4 | 0.2 |
| | Comp. D | Component | | AlS | AlS | AlN |
| | | Conc. | | 0.74 | 7.4 | 7.4 |
| | Comp. C | Component | | Water | Water | Water |
| | Comp. A/FG Mol. Ratio | | | 0.03 | 300 | 521 |
| | Comp. A/Comp. D Mol. Ratio | | | 2.70 | 2.81 | 14.1 |
| Coating | pH | | | 3 | 3 | 3 |
| | Coating Thickness (μm) | | | 0.6 | 0.6 | 0.4 |
| Evaluation | Lubrication | | | ⊙ | ⊙ | ⊙ |
| | Pre-Treat. Corrosion Resistance | | | ⊙ | ⊙ | ○ |
| | Post-Treat. Corrosion Resistance | | | ○ | ○ | ○ |
| | Sludge | | | ○ | ○ | ○ |
| | Phosphatizing | | | ○ | ○ | ○ |
| | Overall Evaluation | | | ⊙ | ⊙ | ⊙ |

NHM: Ammonium molybdate,
NaM: Sodium molybdate,
NHC: Ammonium citrate,
AlN: Aluminum nitrate
AlS: Aluminum Sulfate
Conc. = mmol/L,
FG: Functional group

TABLE 2E

|  |  |  |  | Example | | | | |
|---|---|---|---|---|---|---|---|---|
|  |  |  |  | Ex. 33 | Ex. 34 | Ex. 35 | Ex. 36 | Ex. 37 |
| Processing Liquid Components | Comp. A | Component | | NHM | NHM | NHM | NHM | NHM |
| | | Molybdic Acid Conc. | | 20.8 | 20.8 | 20.8 | 20.8 | 20.8 |
| | Comp. B | Conc. (B1) | Comp. pKa Value | NHC pKa1 = 2.87 | NHC pKa1 = 2.87 | NaT pKa1 = 2.82 | NaT pKa1 = 2.82 | NaT pKa1 = 2.82 |
| | | | Conc. | 1.33 | 1.33 | 1.33 | 1.33 | 1.33 |
| | | | FG Conc. | 2.67 | 2.67 | 2.67 | 2.67 | 2.67 |
| | Comp. D | Component | | AlN | AlN | AlN | AlN | AlS |
| | | Conc. | | 15 | 3.5 | 30 | 0.6 | 50 |
| | Comp. C | Component | | Water | Water | Water | Water | Water |
| | Comp. A/FG Mol. Ratio | | | 7.82 | 7.82 | 7.82 | 7.82 | 7.82 |
| | Comp. A/Comp. D Mol. Ratio | | | 1.39 | 5.96 | 0.69 | 34.7 | 0.42 |
| Coating | pH | | | 3 | 3 | 3 | 3 | 2 |
| | Coating Thickness (μm) | | | 1.5 | 1.3 | 1.1 | 1.1 | 0.9 |
| Evaluation | Lubrication | | | ⊙ | ⊙ | ⊙ | ⊙ | ⊙ |
| | Pre-Treat. Corrosion Resistance | | | ⊙ | ⊙ | ⊙ | ⊙ | ⊙ |
| | Post-Treat. Corrosion Resistance | | | ⊙ | ⊙ | ○ | ○ | ○ |

TABLE 2E-continued

|  |  |  |  |  |  |
|---|---|---|---|---|---|
| Sludge | ○ | ○ | ○ | ○ | ○ |
| Phosphatizing | ○ | ○ | ○ | ○ | ○ |
| Overall Evaluation | ⊙⊙ | ⊙⊙ | ⊙ | ⊙ | ⊙ |

NHM: Ammonium molybdate,
NHC: Ammonium citrate,
NaT: Sodium tartrate,
AlN: Aluminum nitrate
AlS: Aluminum Sulfate
Conc. = mmol/L,
FG: Functional group

|  |  |  |  | Example | | |
|---|---|---|---|---|---|---|
|  |  |  |  | Ex. 38 | Ex. 39 | Ex. 40 |
| Processing Liquid Components | Comp. A | Component Molybdic Acid Conc. |  | NHM 10.4 | NHM 20.8 | NHM 20.8 |
|  | Comp. B | Conc. (B1) | Comp. pKa Value | NaT pKa1 = 2.82 | EDTA•2Na pKa3 = 2.0 | EDTA•2Na pKa3 = 2.0 |
|  |  |  | Conc. | 1.33 | 6.67 | 6.67 |
|  |  |  | FG Conc. | 2.67 | 13.3 | 13.3 |
|  | Comp. D | Component Conc. |  | AlN 0.1 | AlS 3.50 | AlF 3.50 |
|  | Comp. C | Component |  | Water | Water | Water |
|  | Comp. A/FG Mol. Ratio |  |  | 3.90 | 1.56 | 1.56 |
|  | Comp. A/Comp. D Mol. Ratio |  |  | 104 | 5.96 | 5.96 |
| Coating | pH |  |  | 3 | 3 | 3 |
|  | Coating Thickness (μm) |  |  | 1 | 1.2 | 1.3 |
| Evaluation | Lubrication |  |  | ⊙ | ⊙ | ⊙ |
|  | Pre-Treat. Corrosion Resistance |  |  | ○ | ⊙ | ⊙ |
|  | Post-Treat. Corrosion Resistance |  |  | ○ | ⊙ | ⊙ |
|  | Sludge |  |  | ○ | ○ | ○ |
|  | Phosphatizing |  |  | ○ | ○ | ○ |
|  | Overall Evaluation |  |  | ⊙ | ⊙⊙ | ⊙⊙ |

NHM: Ammonium molybdate,
NaT: Sodium tartrate,
AlN: Aluminum nitrate,
AlF: Aluminum fluoride
AlS: Aluminum Sulfate
Conc. = mmol/L,
FG: Functional group

TABLE 2F

|  |  |  |  | Example | | | C. Ex. 1 | C. Ex. 2 |
|---|---|---|---|---|---|---|---|---|
|  |  |  |  | Ex. 41 | Ex. 42 | Ex. 43 |  |  |
| Processing Liquid Components | Comp. A | Component Molybdic Acid Conc. |  | NHM 20.8 | NHM 20.8 | NHM 20.8 | No Chemical Coating | Borax |
|  | Comp. B | Conc. (B1) | Comp. pKa Value | EDTA•2Na pKa3 = 2.0 | EDTA•2Na pKa3 = 2.0 | EDTA•2Na pKa3 = 2.0 |  |  |
|  |  |  | Conc. | 6.67 | 6.67 | 6.67 |  |  |
|  |  |  | FG Conc. | 13.3 | 13.3 | 13.3 |  |  |
|  | Comp. D | Component Conc. |  | ZnN 1.54 | ZnN 15.3 | MgN 8.23 |  |  |
|  | Comp. C | Component |  | Water | Water | Water |  |  |
|  | Comp. A/FG Mol. Ratio |  |  | 1.56 | 1.56 | 1.56 |  |  |
|  | Comp. A/Comp. D Mol. Ratio |  |  | 13.6 | 1.36 | 2.53 |  |  |
| Coating | pH |  |  | 3 | 3 | 3 |  |  |
|  | Coating Thickness (μm) |  |  | 1.1 | 1.3 | 1 | 0 | 1 |
| Evaluation | Lubrication |  |  | ⊙ | ⊙ | ⊙ | x | X |
|  | Pre-Treat. Corrosion Resistance |  |  | ⊙ | ⊙ | ⊙ | X | X |
|  | Post-Treat. Corrosion Resistance |  |  | ⊙ | ⊙ | ⊙ | X | X |

TABLE 2F-continued

| | | | | | | |
|---|---|---|---|---|---|---|
| Sludge | ○ | ○ | ○ | ○ | ○ |
| Phosphatizing | ○ | ○ | ○ | ○ | ○ |
| Overall Evaluation | ⊙○ | ⊙○ | ⊙○ | x | x |

NHM: Ammonium molybdate,
ZnN: Zinc nitrate,
MgN: Magnesium nitrate
Conc. = mmol/L,
FG: Functional group

| | | | | Example | | |
|---|---|---|---|---|---|---|
| | | | | C. Ex. 3 | C. Ex. 4 | C. Ex. 5 |
| Processing Liquid Components | Comp. A | Component Molybdic Acid Conc. | | Zinc Phosphate | NaM 82.8 | NHM 16.2 |
| | Comp. B | Conc. (B1) | Comp. pKa Value Conc. FG Conc. | | | |
| | Comp. D | Component Conc. | | | | |
| | Comp. C | Component | | | | |
| | Comp. A/FG Mol. Ratio | | | | | |
| | Comp. A/Comp. D Mol. Ratio | | | | | |
| Coating | pH | | | | 7.4 | 4 |
| | Coating Thickness (μm) | | | 4.5 | 0.2 | 0.2 |
| Evaluation | Lubrication | | | ⊙ | x | x |
| | Pre-Treat. Corrosion Resistance | | | ⊙ | Δ | Δ |
| | Post-Treat. Corrosion Resistance | | | ⊙ | x | X |
| | Sludge | | | x | ○ | ○ |
| | Phosphatizing | | | x | ○ | ○ |
| | Overall Evaluation | | | x | x | x |

NHM: Ammonium molybdate,
NaM: Sodium molybdate
Conc. = mmol/L,
FG: Functional group

What is claimed is:

1. A non-phosphorus chemical conversion treatment agent or treatment liquid for plastic working, comprising
   A.) a molybdic acid component (A);
   B.) an acid component (B) different from (A);
   C.) an aqueous medium (C); and
   D). a metal component (D) comprising at least one element selected from the group consisting of aluminum, zinc, calcium, iron, manganese, magnesium, and cobalt;
   wherein (B) comprises at least one organic acid component (B1) having at least one group selected from a carboxyl group and a phenolic hydroxyl group, wherein the metal component (D) is selected from the group consisting of nitrates, sulfates, oxides, acetates, and fluorides of the at least one element, wherein the non-phosphorus chemical conversion treatment agent or treatment liquid for plastic working has a pH of 1 to 5, and wherein a carbon steel treated with the non-phosphorus chemical conversion treatment agent or treatment liquid for plastic working has improved lubricity for plastic working as measured by a spike test compared to the carbon steel not treated with the non-phosphorus chemical conversion treatment agent or treatment liquid for plastic working.

2. The non-phosphorus chemical conversion treatment agent or treatment liquid for plastic working according to claim 1, wherein (B1) has a pKa value of 5 or less.

3. The non-phosphorus chemical conversion treatment agent or treatment liquid for plastic working according to claim 1, wherein (B1) comprises one or more selected from the group consisting of a carboxylic acid, an aminocarboxylic acid, a hydroxy acid, catechols, and ascorbic acid.

4. The non-phosphorus chemical conversion treatment agent or treatment liquid for plastic working according to claim 1, wherein (B1) comprises one or more selected from the group consisting of EDTA, NTA, HEDTA, DTPA, EDDA, GEDTA, CyDTA, HIDA, TTHA, malic acid, tartaric acid, citric acid, oxalic acid, azelaic acid, aspartic acid, maleic acid, malonic acid, lactic acid, ascorbic acid, catechol, tiron, and salts thereof.

5. The non-phosphorus chemical conversion treatment agent or treatment liquid for plastic working according to claim 1, wherein (A) and (B1) are present in amounts such that a molar ratio of the molybdic acid amount to a total amount of the carboxyl group and the phenolic hydroxyl group of (B1), calculated as:

(molybdic acid)/(total of carboxyl group and phenolic hydroxyl group)

is in a range of from 0.01 to 800.

6. The non-phosphorus chemical conversion treatment agent or treatment liquid for plastic working according to claim 1, wherein a molar ratio of (A) to (D) is in a range of from 0.3 to 200.

7. A chemical conversion film obtained by treating a metal material with the non-phosphorus chemical conversion treatment liquid for plastic working according to claim 1.

8. A metal material comprising the chemical conversion film according to claim 7.

9. The metal material according to claim 8, further comprising a lubricant layer on the chemical conversion film.

10. A method for producing a metal material having a chemical conversion film, the method comprising a chemical conversion treatment step of treating a metal material with the non-phosphorus chemical conversion treatment liquid for plastic working according to claim 1, thereby forming a chemical conversion film on the metal material.

11. The method for producing a metal material with a chemical conversion film according to claim 10, the method comprising a step of applying a lubricant onto the chemical conversion film after the chemical conversion treatment step.

12. The non-phosphorus chemical conversion treatment agent or treatment liquid for plastic working according to claim 1, wherein the non-phosphorus chemical conversion treatment agent or treatment liquid for plastic working has a pH of 2.5 to 4.5.

* * * * *